United States Patent [19]

Tekelly et al.

[11] Patent Number: 5,096,223
[45] Date of Patent: Mar. 17, 1992

[54] ENERGY ABSORBING BRACKET FOR INTERIOR PANELS

[75] Inventors: Joseph P. Tekelly, Troy; Alexander Lesko, Royal Oak, both of Mich.

[73] Assignee: Ford Motor Company, Dearborn, Mich.

[21] Appl. No.: 633,865

[22] Filed: Dec. 26, 1990

[51] Int. Cl.$^5$ ............................................. B60R 21/02
[52] U.S. Cl. ........................ 280/748; 280/751; 280/752
[58] Field of Search ............ 280/751, 752, 748, 750, 280/779, 780, 784; 188/377, 371; 293/133; 296/70, 192, 194

[56] References Cited

U.S. PATENT DOCUMENTS

| | | | |
|---|---|---|---|
| 3,850,447 | 11/1974 | Nagazumi et al. | 280/752 |
| 3,930,665 | 1/1976 | Ikawa | 280/751 |
| 3,983,962 | 10/1976 | Torke | 188/377 |
| 3,983,963 | 10/1976 | Nakamura | 188/377 |
| 4,320,909 | 3/1982 | Nakamori et al. | 280/752 |
| 4,421,343 | 12/1983 | Yoshitsungu et al. | 280/752 |
| 4,434,999 | 3/1984 | Sato | 280/752 |
| 4,593,949 | 6/1986 | Tanimoto | 296/204 |
| 4,669,776 | 6/1987 | Harasaki | 296/192 |
| 4,684,151 | 8/1987 | Drewek | 280/784 |
| 4,702,515 | 10/1987 | Kato et al. | 188/377 |
| 4,723,811 | 2/1988 | Harasaki | 296/194 |
| 4,789,198 | 12/1988 | Ide | 296/192 |
| 4,892,350 | 1/1990 | Kijima | 296/204 |
| 4,893,834 | 1/1990 | Honda et al. | 280/751 |
| 4,946,192 | 8/1990 | Kuwahara | 280/751 |

FOREIGN PATENT DOCUMENTS

| | | | |
|---|---|---|---|
| 0009654 | 4/1980 | European Pat. Off. | 188/371 |
| 808126 | 1/1937 | France . | |
| 619379 | 1/1986 | Japan | 296/203 |
| 1054171 | 2/1982 | U.S.S.R. | 296/29 |

*Primary Examiner*—Kenneth R. Rice
*Assistant Examiner*—M. Shaughnessy
*Attorney, Agent, or Firm*—Daniel M. Stock; Clifford L. Sadler

[57] ABSTRACT

An impact absorbing vehicular device for cushioning an occupant's knees or other extremities, the device including a contacting interior panel member supported by one or more impact absorbing brackets in the form of a U-shaped channel member having non-parallel sides in three normal views (e.g., side view, plan view, front view) and with the contacting interior panel being supported by the base wall of the channel member. The side walls of the channel member including ribs or darts extending normal to the base wall to encourage the formation of a plurality of folds, rather than a single fold, in response to a high energy impact. The side walls, in one embodiment, each being bowed outwardly from one another.

26 Claims, 3 Drawing Sheets

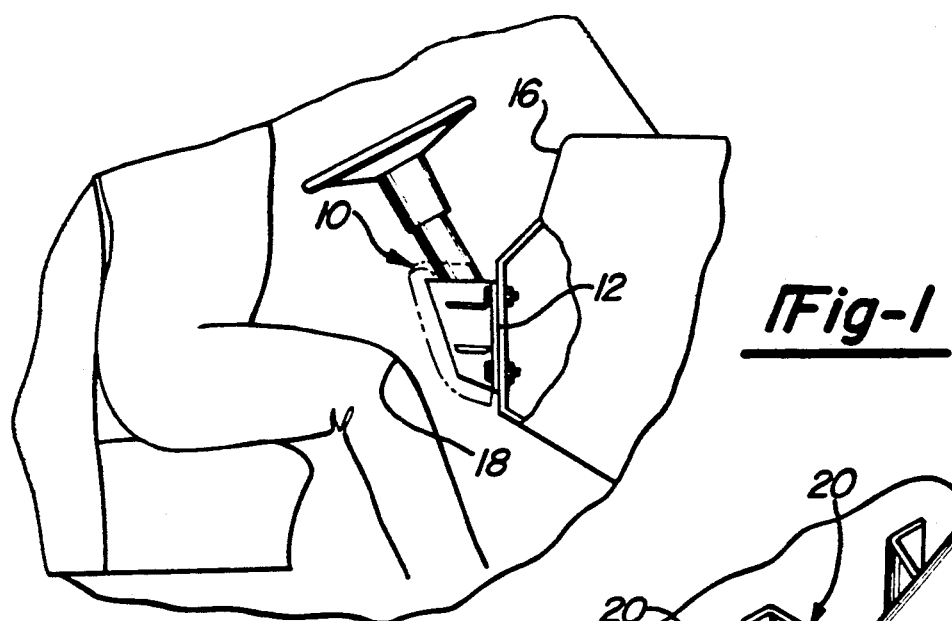
*Fig-1*
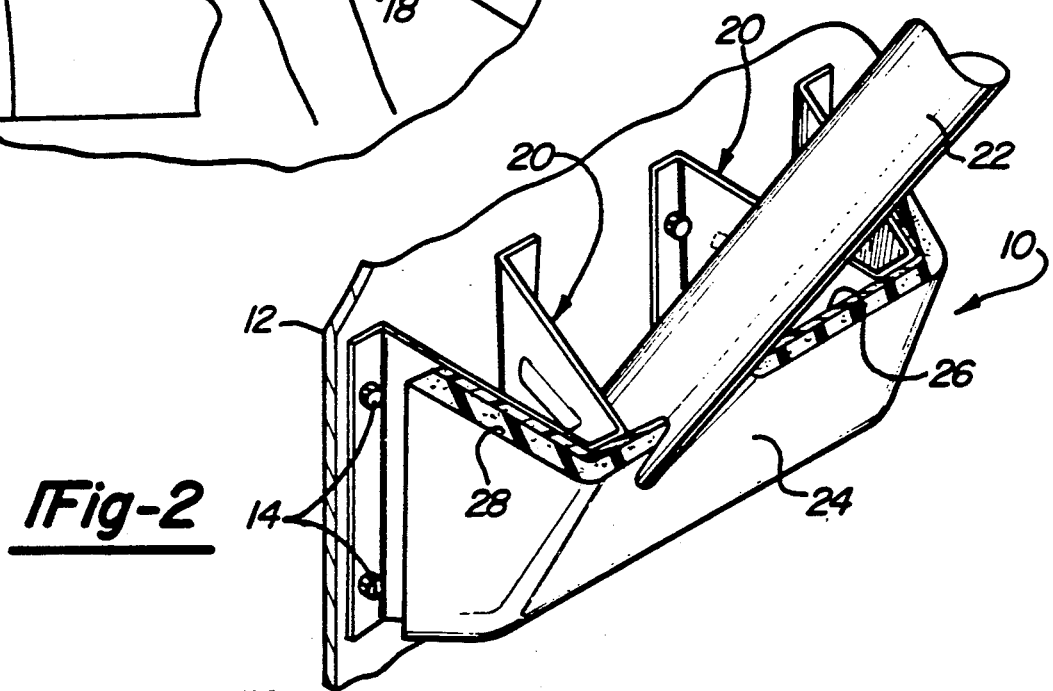
*Fig-2*
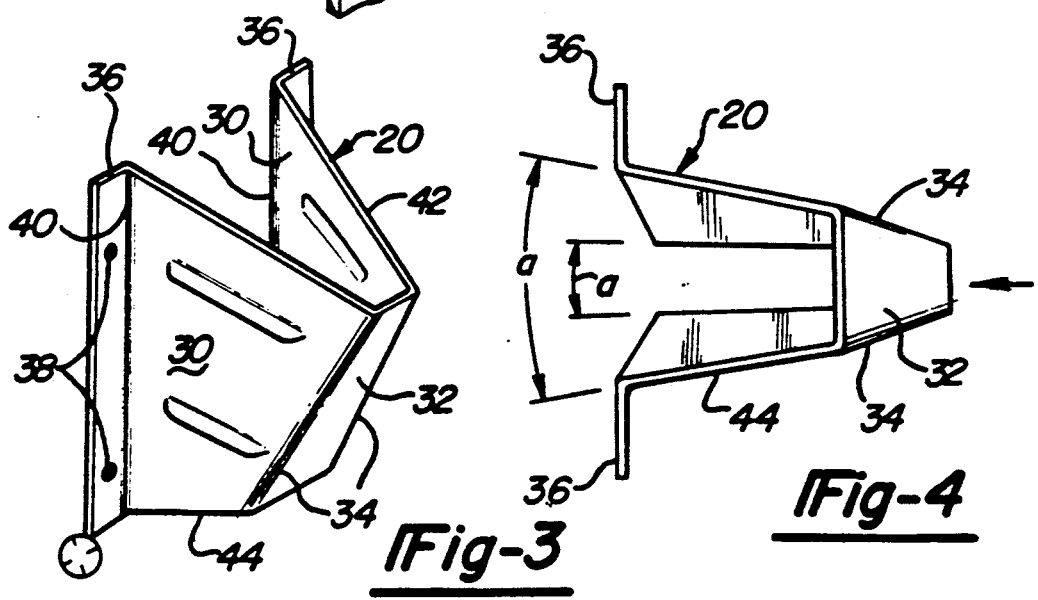
*Fig-3*  *Fig-4*

ENERGY ABSORBING BRACKET FOR INTERIOR PANELS

TECHNICAL FIELD

The present invention relates to vehicular safety devices in the form of collision absorbing bracket assemblies supporting, for example, interior panels which may be unavoidably struck by the occupant during a collision, particularly knee bolster assemblies.

BACKGROUND ART

The desirability of providing the vehicle interior with interior panels and supporting structure therefor having the capability of absorbing the impact energy of an occupant during a collision has long been established. These are several of many safety devices incorporated in the interior of the vehicle including seat belts, expandable airbags, and safety engineered instrument panels. Notable in this category of safety engineered interior panels and support structures is the provision of a knee-protecting debolsters straddle the steering column and are located at a point below the steering wheel and generally on the lower portion of the instrument panel. They are designed to absorb the impact on the occupant's knee during a head-on or nearly head-on collision as a means of supplementing the intended purpose of the seat belts and/or other occupant restraining devices which may or may not be in use by the occupant at the time of the collision.

Such devices are shown in U.S. Pat. Nos. 4,320,909; 4,421,343; 4,434,999; and U.S. Pat. No. 4,893,834.

Each is designed to yield upon the occupant's knee striking the knee bolster assembly at a force lower than that which would cause permanent injury to the occupant Still another device, one in common use in automotive and light truck design, is an energy absorption knee bolster supporting bracket in the form of a sheet metal, U-shaped channel member having opposed side walls converging at equal angles toward the base wall supporting the knee bolster pad. This structure has the advantage of eliminating the possibility of the bracket collapsing solely at the break lines in response to an offset load (a characteristic known as "match-boxing") and provides a very acceptable product However, there is a need for a knee bolster assembly meeting all the criteria of: (1) maintaining a consistently level load curve preferably at the initial peak level; (2) responding to lateral loading as well as straight-on loading with essentially the same deformation-displacement curve characteristics; (3) avoiding column loading on the side walls of the bracket assembly upon receiving both straight-on loads and lateral loads; (4) minimizing the load on the occupant's knee, while maximizing the amount of energy-absorbed by the bracket per unit displacement; (5) eliminating "match-boxing" during collapse of the assembly; (6) eliminating the tendency of the supporting bracket to fold along a single fold line; and (7) providing the aforementioned criteria while remaining simply constructed and relatively inexpensive.

SUMMARY OF THE INVENTION

The present invention has for its objects the meeting of all of the aforementioned criteria.

In accordance with the present invention, there is provided an impact absorbing vehicular knee bolster device for cushioning an occupant's knees or other lower extremities from injurious forces resulting from a collision. The device includes a bracket shaped as an elongated channel member of generally U-shaped cross-section having a base wall lying in a first plane displaced generally normally to the impact load to be received. A pair of oppositely disposed, spaced side walls extend outwardly from the base wall to define the U-shaped cross-section, one side wall lying generally in a second plane and intersecting the base wall at a first break line, and the other side wall lying generally in a third plane and intersecting the base wall at a second break line, with the first and second break lines converging toward one another. Each side wall intersects the base wall at an obtuse angle. Each side wall includes a supporting edge opposite the respective break line, with the supporting edge and break line of each side wall converging toward one another preferably in a direction opposite the direction of convergence of the first and second break lines.

Stated otherwise, the U-shaped channel member has non-parallel sides in three normal views (e.g. side view, plan view, front view), which the inventors have coined to be a "Tekhedral" shape.

During a high energy impact, this bracket deforms and crushes in such a way that the energy of the impact is dissipated in a more efficient wave form. Also, angles of impact of up to 30° off of the symmetrical axis cause no significant change in the response.

In another embodiment of the present invention, there is provided fold control means disposed on each side wall for resisting the formation of a longitudinal fold at the midpoint of the side walls and promoting the formation of a plurality of longitudinal folds across each side wall upon receiving an impact load at the base wall of sufficient magnitude to plastically deform the channel member, rather than or at least prior to the formation of a longitudinal fold at the midpoint of each side wall. The fold control means comprises one or more darts disposed generally normally to the base wall, the respective ends of each dart being spaced a substantial distance from the break lines and supporting edges wherein (i) the forming of the plurality of longitudinal folds will be facilitated between the ends of each dart and the respective supporting edges and break lines, and (ii) a crease line for each fold will extend longitudinally of the corresponding ends of each dart.

In yet another embodiment of the present invention, the side walls of the channel member are bowed slightly outwardly in the direction of the outer surface of the side walls to present a partially cylindrical outer wall surface generated by a radius extending from an axis generally parallel to the break line on the side wall.

Other objects, advantages and novel features of the present invention will become apparent from the following detailed description of the invention when considered in conjunction with the accompanying drawings.

BRIEF DESCRIPTION OF THE DRAWINGS

FIG. 1 is a side elevation view of the vehicle interior in the area of the steering wheel and showing the general assembly of the knee bolster assembly in accordance with the present invention;

FIG. 2 is a perspective view showing the knee bolster supporting bracket of the present invention in relation to the steering column and knee bolster per se;

FIG. 3 is a perspective view of a single knee bolster supporting bracket in accordance with the present invention;

FIG. 4 is a bottom plan view of the knee bolster supporting bracket shown in FIG. 3;

BEST MODE FOR CARRYING OUT THE INVENTION

Figure 5:
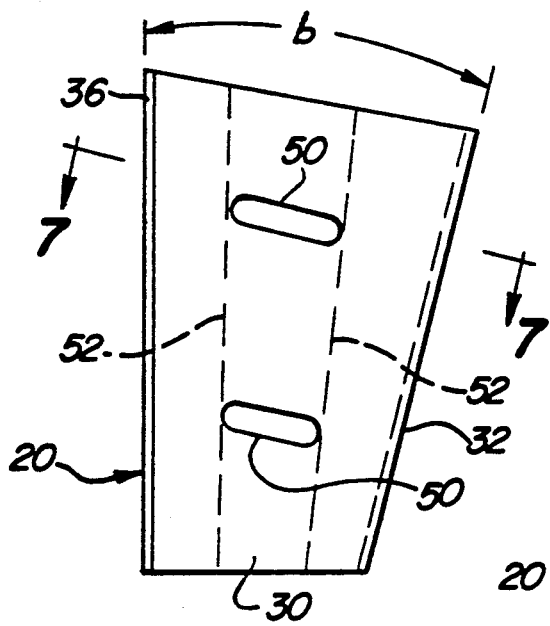
FIG. 5 is a side view of the knee bolster supporting bracket shown in FIG. 3.

In FIGS. 1 and 2, there is shown the general installation of the energy absorbing knee bolster and bracket assembly 10. It is affixed to a supporting interior frame structure 12 by fasteners 14. A portion of the instrument panel 16 may be affixed to the same support structure. The assembly is positioned in the area of the occupant's knee 18 at a distance and height determined by the usual statistics governing interior vehicle design. In one example, as shown in FIG. 2, the knee bolster bracket assembly 10 will include two brackets 20 positioned on each side of the steering column 22. Supported at the base wall or front wall of the brackets 20 is a bolster or soft padded panel 24 comprising a semi-rigid backing 26 such as sheet metal having bonded thereto a substantially thick cushion 28 of shock absorbing foamed thermoplastic material or the like.

The brackets 20 are sufficiently rigid that each will withstand, without permanent deflection, any light collision by the occupant's knee against the bolster 24 below a certain predetermined impact load. At impacts above the predetermined impact load, the bracket apparatus are designed to crush or collapse in a controlled manner. Ideally, the assembly will yield at a constant impact load/displacement ratio. However, the particular load/displacement characteristics are to be determined by the specific design of the brackets 20.

FIGS. 3-6 show an individual energy absorbing bracket 20. Its overall shape is that of a Tekhedral, a term which is not known in engineering standards, but one which has been coined by the inventors to describe a channel member wherein the three walls defining the channel member lie in three different planes all of which are converging upon one another at an acute angle and one in which if the channel member were to be formed from a flat sheet, it would be seen to comprise each of the three wall members being in the general form of a trapezoid. Otherwise defined, a Tekhedral is a U-shaped channel member having non-parallel sides in three normal views.

Thus, the bracket essentially comprises two oppositely disposed side walls 30 connected by a base wall 32 along break lines 34. The side walls may be folded along oppositely disposed break lines to form support flanges 36 to provide the means for securing the bracket to the supporting interior frame structure 12 by drilling holes 38 through the flange to which the fasteners 14 may pass. The bracket is preferably made of steel sheet metal, i.e., 0.040 inches thick and has a yield strength of approximately 30,000 pounds per square inch (psi). Any other suitable material having similar plastic yield characteristics may be used, for example, non-ferrous metal alloys.

The break lines forming the flanges 36 constitute supporting edges 40 for the bracket. The supporting edges 40 and break lines 34 define the width of the side walls whereas the top and bottom edges 42 and 44 respectively define the length or height of the side walls 30.

As seen in FIG. 4, the side walls 30 which lie in respective first and second planes are disposed at an angle to the base wall as defined by the included angle a. Included angle a will vary from the top edge 42 to the bottom edge 44 since the first and second planes defining the side walls are converging towards one another at the angle c. Thus, as shown in FIG. 4, at the lower extremities of the side wall, the angle a may be in the order of 90° whereas at the upper extremities of the side wall angle a in this range of 10°–90° is acceptable and will be effective in precluding match-boxing and contributing to a more desirable load/displacement curve. A preferred combination of angles a at the lower and upper extremities is 10° and 30°, respectively.

As noted earlier, it has been common practice to provide a channel member as a supporting bracket wherein the side walls are at an angle relative to one another equal to that of angle a. However, in such construction, the base wall has been in the general form of a rectangle such that all break lines are parallel to one another. With the Tekhedral channel member, the break lines 34 are not parallel to one another nor to the break lines forming the supporting edges 40 and this will provide distinctly different collision displacement characteristics as described more fully below.

Figure 6:
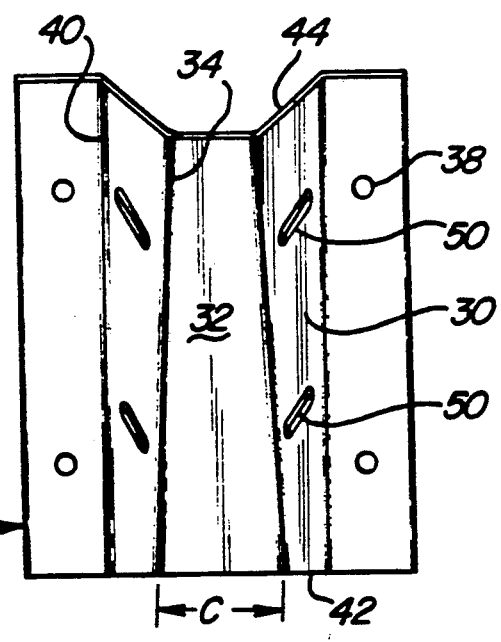
FIG. 6 is a front view of the knee bolster supporting bracket shown in FIG. 3.

Referring to FIGS. 5 and 6, it will be seen that the supporting edge 40 and break line 34 of each side wall converge upon one another at an angle b in the direction of the bottom of the bracket. The base wall 32 is defined by the break lines 3 which converge toward one another at an angle c. Preferably, break lines 34 will converge upon one another in the direction of the upper limits of the bracket. Alternatively, the break lines may converge toward one another in the direction of the bottom edge 44 of the side wall. With either construction, a preferred range of values for the angle b is 5° to 45° with 30° being preferred.

The angle c may range from 10° to 90°, however, 30° is preferred. A minimum value of 10° is considered necessary to assure overall, in combination with the general features of the Tekhedral member, that desired load/displacement characteristics are produced.

It will also be noted in FIGS. 3–6 that the Tekhedral channel member includes a plurality of ribs or darts 50 formed on the side walls 30. The purpose of the darts is to cause a number of folds to be formed lengthwise of the side wall during a collision. Without the darts, a single fold would be developed in each side wall, generally along an axis extending through the midpoint of the side wall, with the break line at the base wall 32 and flange 36 being the crease line for the fold. With the provision of the darts 50, there is caused several folds across each side wall, with a crease line for each being formed at each end of the darts as shown in dotted lines in FIG. 5 and designated 52. Obviously, the crease lines are not as truly geometric as indicated since during a collision many forces come into play, but over the designed total displacement of the supporting bracket, the two folds will be generally formed at the ends of the darts rather, or at least prior to any fold being formed at the midpoint thereof.

The darts are preferably formed in the side walls, as by embossing, so that they are expanded outwardly toward the outer surface of each side wall as shown in FIG. 4. Other forms of darts or methods of forming the darts may be acceptable, provided that each encourages the forming of a fold line at its ends prior to allowing a fold to occur through the midpoint of the side wall.

The geometry of the darts is important to the invention. At least one dart 50 is required, and may be all that is required. More than one may be used, for example, as shown wherein two darts 50 are provided with one at each end of the side wall. Each dart is centered across the width of the side wall and extends in a direction generally normal to the base wall 32. It is preferred that the dart be approximately ⅓ the length of the width of the side wall at its relative position along the length of the side wall so that there is sufficient metal between the ends of the darts and the respective break line 34 and supporting edge 40 to allow a fold to develop during any collision causing displacement of the base wall toward the supporting edge of the side wall. Alternatively, the dart may be disposed normal to the supporting edge or at any angle between the two extremes. Any alignment of the darts outside this particular range is not recommended since it would diminish the likelihood of the multiple folds being created. While the length of each dart may be varied, it is not recommended that the dart be of a length less than ½ the total width of the side wall at its relative position along the length of the side wall. Further, experimentation has shown that the width of the dart relative to its length should be held to about ⅜ inch wide for darts ranging in length from ¾ inch to 2 inches, which establishes a ratio ranging from 1:2 to 1:5. A ratio of 1:2 is believed best since the objective is to limit the number of darts to a minimum. No more than two are required per each side wall, one at each end, for the usual vehicular application having a bracket approximately 7 inches long. Where only one dart is used, it will be placed at the middle of the length of the side wall.

Figure 9:
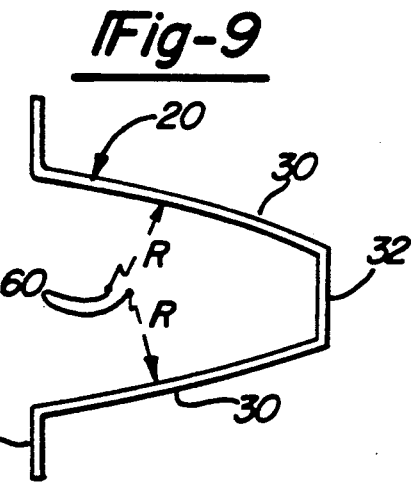
FIG. 9 is a plan view of the knee bolster supporting bracket showing an alternative embodiment of the present invention.

A further embodiment of the present invention is shown in FIG. 9 wherein the side walls 30 are caused to be slightly convex in a radially outward direction as defined by a radius R scribing an arc from a center 60 located inward of the inner surface of each respective side wall. The purpose of providing the slight curvature is to eliminate the possibility of column loading. Column loading is a phenomenon occurring during a collision when the direction of the impact follows exactly the plane of the side wall without producing any significant vectored lateral force sufficient to cause the side wall to bow and yield along a crease line. Five arc degrees across the width of the side wall is sufficient curvature for this purpose. With the slight curvature in the side wall, it is impossible to column load the bracket.

Figure 7:
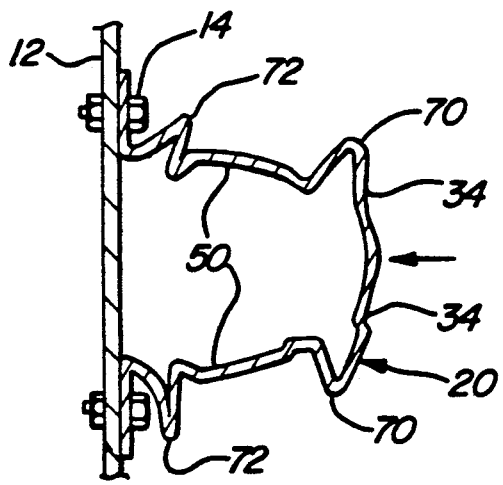
FIG. 7 is a sectional view of the knee bolster supporting bracket taken at section 7—7 in FIG. 5 following a collision during which the bracket has been nearly fully deformed in accordance with the planned displacement of the assembly.
Figure 8:
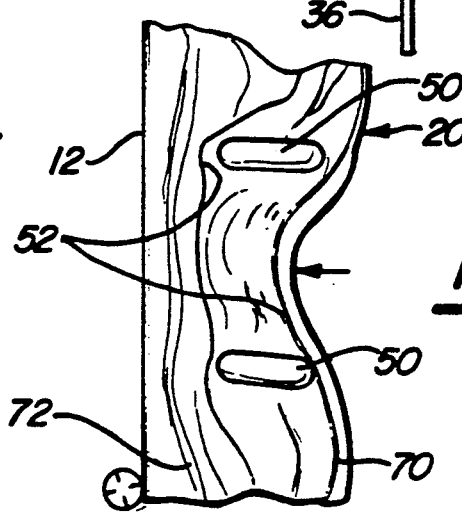
FIG. 8 is a side view of the knee bolster supporting bracket shown in FIG. 5 following a collision during which the bracket has been nearly fully deformed in accordance with the planned displacement of the assembly.

In operation, as seen in FIGS. 7-9, during any impact of the occupant's knee with the bolster exceeding a predetermined load, as designated by the arrow in FIG. 7, the impact load will cause the bracket to collapse as shown. A fold 70 will be caused to develop midway between the break line 34 and end of the dart 50. Likewise, a second fold 72 will be caused to develop between the opposite end of the dart 50 and the supporting edge 40.

As seen in FIG. 8, even though the center of the impact force as shown by the arrow may be central of the darts 50, the general tendency of the bracket will be to form a fold 70,72 running between each respective end of the darts 50. Further, because of the channel member being shaped as a Tekhedral, the manner in which the bracket folds will be more complex, and less geometrically predictable, because of the different angles a, b and c at which the side walls and base wall intersect one another.

Figure 10:
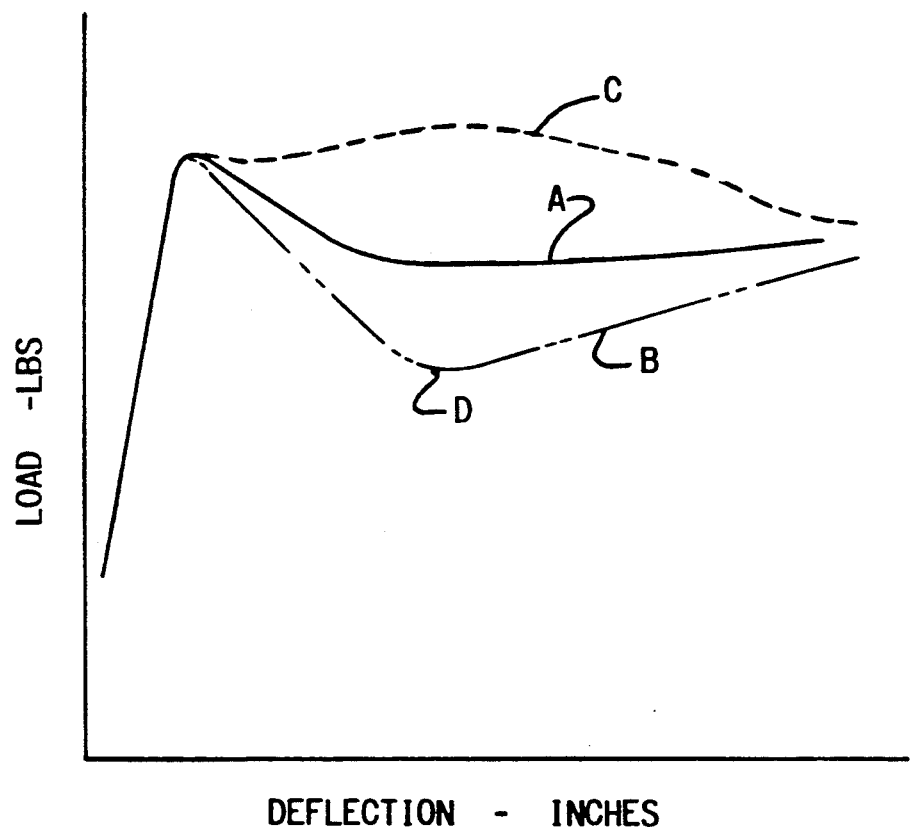
FIG. 10 is a graph of impact load versus deflection of the bracket of the present invention in the forward direction and showing comparative results with a bracket of conventional design.

The load-deflection results are shown in FIG. 10. The energy absorbing characteristics of the bracket member 20 without being provided with darts 50 is shown in solid line and designated A. Similarly, the energy absorbing characteristics of a conventional channel member having side walls intersecting the base wall at an acute angle and having all four break lines parallel to one another and acting as crease lines for the fold, as earlier described, is shown in phantom line and designated B.

It will be seen that the conventional bracket member, once it begins to yield as a result of a predetermined impact load L, yields progressively easier as displacement continues. This is because only one fold is being propagated, generally at the midpoint of the bracket. As the fold develops, the bracket yields at an increasing rate reaching a certain point of displacement, designated D, at which time other factors in the geometry of the knee bolster assembly may cause the load to increase.

With the Tekhedral channel member without darts represented by curve A, upon receiving an impact load above the bracket will yield at a predetermined load L but due to its complex geometric shape, the collapse of the bracket, even though producing a single fold will not be nearly as uniformly geometric as the conventional bracket member described earlier. Thus, the load will be nearly constant, but somewhat less than the predetermined load L initially deforming the bracket.

Providing the channel member with darts 50, produces a result as shown in dotted line designated C in FIG. 10 wherein the load at which the bracket member 20 is collapsed can be caused to be nearly equal, and even greater than the initial load L. A change in the dart design within the parameters discussed above, can produce any number of load/deflection characteristics as shown in the shaded section in FIG. 10.

Further, owing to the Tekhedral shape, the bracket 20 can substantially maintain the same load/deflection characteristics as shown in FIG. 10 even when the force of impact is lateral to the base wall member by as much as 30° as represented by the arrow shown in phantom in FIG. 7.

It will also be understood that while the form of the invention herein shown and described constitutes a preferred embodiment of the invention, it is not intended to illustrate all possible forms thereof. It will also be understood that the words used are words of description rather than limitation, and various changes may be made without departing from the spirit and scope of the invention disclosed.

We claim:

1. An impact absorbing vehicular device for cushioning an occupant from injurious forces resulting from a collision, the device being an elongated channel member of generally U-shaped cross-section, said channel member comprising:
   a base wall lying in a first plane, the base wall adapted to receive an impact load directed generally normal to said first plane;
   a pair of oppositely disposed, spaced side walls extending outwardly from said base wall to define said U-shaped cross-section, one said side wall lying generally in a second plane and intersecting said base wall at a first break line, the other said side wall lying generally in a third plane and intersecting said base wall at a second break line, each said side wall intersecting said base wall at an obtuse angle, said first and second break lines converging toward one another; and
   a pair of supporting edges, one said supporting edge extending from one said side wall opposite said first break line, the other supporting edge extending from the other said side wall opposite said second break line, said supporting edge and said break line of each said side wall converging toward one another in a direction opposite the direction of convergence of said first and second break lines.

2. An impact absorbing vehicular knee bolster device for cushioning an occupant's knees or other lower extremities from injurious forces resulting from a collision, the device being an elongated channel member of generally U-shaped cross-section, said channel member comprising:
   a base wall lying in a first plane, the base wall adapted to receive an impact load directed generally normal to said first plane;
   a pair of oppositely disposed, spaced side walls extending outwardly from said base wall to define said U-shaped cross-section, one said side wall lying generally in a second plane and intersecting said base wall at a first break line, the other said side wall lying generally in a third plane and intersecting said base wall at a second break line, each said side wall intersecting said base wall at an obtuse angle, said first and second break lines converging toward one another; and
   a pair of supporting edges, one said supporting edge extending from one said side wall opposite said first break line, the other supporting edge extending from the other said side wall opposite said second break line, said supporting edge and said break line of each said side wall converging toward one another in a direction opposite the direction of convergence of said first and second break lines.

3. The invention as defined in claim 2 further including fold control means disposed on at least one said side wall for resisting the propagation of a longitudinal fold at the midpoint of said side wall and promoting the propagation of a plurality of longitudinal folds across said side wall upon receiving an impact normal to said base wall of sufficient magnitude to plastically deform said channel member prior to the propagation of a longitudinal fold at the midpoint of said side wall.

4. The invention as defined in claim 2 further including fold line control means disposed on each said side wall for resisting the propagation of a longitudinal fold substantially at the midpoint of said side walls and promoting the propagation of a plurality of longitudinal folds across each side wall upon receiving an impact normal to said base wall of sufficient magnitude to plastically deform said channel member prior to the propagation of a longitudinal fold at the midpoint of each said side wall.

5. The invention as defined in claim 4 wherein said fold line control means comprises at least one dart disposed generally normally to said base wall, the respective ends of said dart being spaced a substantial distance from said break lines and said supporting edges wherein the propagation of said plurality of longitudinal folds will be facilitated between the ends of said dart and the respective said supporting edges and break lines.

6. The invention as defined in claim 1 further including fold control means in the form of a dart disposed on each said side wall for resisting the propagation of a longitudinal fold substantially at the midpoint of said side walls and promoting the propagation of a plurality of longitudinal folds across each side wall upon receiving an impact normal to said base wall of sufficient magnitude to plastically deform said channel member prior to the propagation of a longitudinal fold at the midpoint of each said side wall.

7. The invention as defined in claim 6 wherein said darts are in the form of embossed ribs raised on the outer surface of each said side wall.

8. The invention as defined in claim 6 wherein each said dart is centrally disposed of a respective side wall midway between said break line and said supporting edge.

9. The invention as defined in claim 8 wherein each said dart is of a length substantially equal to ⅓ of the width of said side wall at the longitudinal axis of said dart.

10. The invention as defined in claim 8 wherein each said dart has a width to length ratio ranging from about 1:2 to 1:5.

11. The invention as defined in claim 9 wherein each said dart has a width to length ratio ranging from about 1:2 to 1:5.

12. The invention as defined in claim 4 wherein each said side wall is generally flat and lies within said respective second and third planes.

13. The invention as defined in claim 4 wherein each said side wall is slightly convex in the direction of the outer surface thereof, the degree of convexity subscribing a distance of at least about 5 arc degrees from said supporting edge to said break line.

14. The invention as defined in claim 1 wherein said side walls converge toward said base wall at an included angle ranging from about 10° to 90°.

15. The invention as defined in claim 1 wherein said side walls converge toward said base wall at an included angle of about 10° to 30°.

16. The invention as defined in claim 1 wherein said first and second break lines converge toward one another at an angle ranging from about 10° to 90°.

17. The invention as defined in claim 1 wherein said first and second break lines converge toward one another at an angle of about 30°.

18. The invention as defined in claim 14 wherein said first and second break lines converge toward one another at an angle ranging from about 10° to 90°.

19. The invention as defined in claim 18 wherein said supporting edge and said break line of each side wall converge toward one another at an angle ranging from 5° to 45°.

20. The invention as defined in claim 19 wherein said channel member is formed of steel sheet metal having a yield strength of about 30,000 psi and being approximately 0.040 inches thick uniformly across each said wall.

21. The invention as defined in claim 1 wherein said supporting edge and said break line of each side wall converge toward one another at an angle of about 30°.

22. The invention as defined in claim 17 wherein said supporting edge and said break line of each side wall converge toward one another at an angle ranging from 5° to 45°, and said side walls converge toward said base wall at an included angle ranging from about 10° to 90°.

23. The invention as defined in claim 22 further including fold control means disposed on each said side wall for resisting the propagation of a longitudinal fold substantially at the midpoint of said side walls and promoting the propagation of a plurality of longitudinal folds across each said side wall upon receiving an impact normal to said base wall of sufficient magnitude to plastically deform said channel member prior to the propagation of a longitudinal fold at the midpoint of each said side wall.

24. The invention as defined in claim 23 wherein said fold control means comprises at least one dart disposed generally normally to said base wall, the respective ends of said dart being spaced a substantial distance from said break lines and said supporting edges wherein the propagation of said plurality of longitudinal folds will be facilitated between the ends of said dart and the respective said supporting edges and break lines.

25. The invention as defined in claim 23 wherein said fold control means comprises a plurality of darts disposed generally normally to said base wall, the respective ends of said darts being spaced a substantial distance from said break lines and said supporting edges wherein the propagation of said plurality of longitudinal folds will be facilitated between the ends of said darts and the respective said supporting edges and break lines.

26. The invention as defined in claim 25 wherein said darts are in the form of embossed ribs raised on the outer surface of each said side wall.

* * * * *

UNITED STATES PATENT AND TRADEMARK OFFICE
CERTIFICATE OF CORRECTION

PATENT NO. : 5,096,223
DATED : March 17, 1992
INVENTOR(S) : Joseph P. Tekelly, et al It is certified that error appears in the above-identified patent and that said Letters Patent is hereby corrected as shown below:

Column 1, line 22, after "protecting" delete "debolsters" and insert --device sometimes referred to as a knee bolster. Knee bolsters--.

Column 1, line 46, after "product" insert a period (.).

Column 4, line 29, after "angle $\underline{a}$" insert --may be in the order of 10°. Any value of angle $\underline{a}$--.

Column 4, line 49, delete "3" and substitute --34--.

Signed and Sealed this

Twenty-first Day of September, 1993

*Attest:*

BRUCE LEHMAN

*Attesting Officer*     *Commissioner of Patents and Trademarks*